United States Patent
Granneman et al.

(10) Patent No.: US 8,049,163 B1
(45) Date of Patent: *Nov. 1, 2011

(54) CALIBRATION SYSTEMS AND METHODS FOR INFRARED CAMERAS

(75) Inventors: Russell Granneman, Goleta, CA (US); Nuwan Nagahawatte, Goleta, CA (US); Richard M. Goeden, Goleta, CA (US); Ted Takagi, Santa Maria, CA (US); Robert Ernst, Carpinteria, CA (US); Gary B. Hughes, Santa Maria, CA (US); Joseph Kostrzewa, Buellton, CA (US); John Graff, Santa Barbara, CA (US); George Speake, Santa Barbara, CA (US); Michael Kent, Goleta, CA (US); Neela Nalam, Goleta, CA (US); Stephen Lyon, Goleta, CA (US); Barbara Sharp, Santa Barbara, CA (US); Pierre Boulanger, Goleta, CA (US); Neil Cutcliffe, Goleta, CA (US); Tim Martin, Santa Barbara, CA (US); Ted Hoelter, Goleta, CA (US)

(73) Assignee: Flir Systems, Inc., Wilsonville, OR (US)

( * ) Notice: Subject to any disclaimer, the term of this patent is extended or adjusted under 35 U.S.C. 154(b) by 326 days.

This patent is subject to a terminal disclaimer.

(21) Appl. No.: 12/202,896

(22) Filed: Sep. 2, 2008

(51) Int. Cl.
G01D 18/00 (2006.01)
G01J 1/00 (2006.01)
G01J 3/10 (2006.01)

(52) U.S. Cl. ............ 250/252.1; 250/495.1; 250/504 R
(58) Field of Classification Search .......... 250/252.1, 250/495.1, 504 R
See application file for complete search history.

(56) References Cited

U.S. PATENT DOCUMENTS

| | | | |
|---|---|---|---|
| 3,765,779 A | 10/1973 | Hunt et al. | |
| 4,480,372 A * | 11/1984 | Wirick et al. | 29/458 |
| 4,965,448 A * | 10/1990 | Morse et al. | 250/252.1 |
| 5,324,937 A * | 6/1994 | Chen et al. | 250/252.1 |
| 5,471,055 A * | 11/1995 | Costanzo et al. | 250/252.1 |
| 5,756,992 A * | 5/1998 | Spindler | 250/252.1 |
| 5,811,808 A | 9/1998 | Cannata et al. | |
| 6,028,309 A | 2/2000 | Parish et al. | |
| 6,377,300 B1 * | 4/2002 | Morris et al. | 348/207.99 |
| 6,586,831 B2 | 7/2003 | Gooch et al. | |
| 6,812,465 B2 | 11/2004 | Parrish et al. | |
| 7,009,638 B2 | 3/2006 | Gruber et al. | |
| 7,470,902 B1 | 12/2008 | Kraemer et al. | |
| 2003/0057371 A1 | 3/2003 | Wood | |
| 2004/0208350 A1 | 10/2004 | Rea et al. | |
| 2005/0185179 A1* | 8/2005 | Wang | 356/328 |
| 2005/0205773 A1 | 9/2005 | Fauci et al. | |
| 2005/0258367 A1 | 11/2005 | Anderson et al. | |
| 2006/0081777 A1 | 4/2006 | Bevan et al. | |

(Continued)

OTHER PUBLICATIONS

Parrish, William J., and James T. Woolaway, Improvements in uncooled systems using bias equalization, Proceedings of SPIE, 1998.

*Primary Examiner* — David Porta
*Assistant Examiner* — Mindy Vu
(74) *Attorney, Agent, or Firm* — Haynes and Boone, LLP (57) ABSTRACT

Systems and methods directed to calibration techniques for infrared cameras are disclosed. For example, a method of obtaining calibration information for an infrared device includes providing a calibration target adapted to provide a low-emissivity scene; performing a calibration operation on the infrared device to obtain the calibration information; and storing the calibration information.

27 Claims, 10 Drawing Sheets

U.S. PATENT DOCUMENTS

| | | |
|---|---|---|
| 2006/0279632 A1 | 12/2006 | Anderson |
| 2007/0029484 A1 | 2/2007 | Anderson et al. |
| 2007/0033999 A1* | 2/2007 | Bothe et al. .................. 73/118.2 |
| 2007/0087311 A1* | 4/2007 | Garvey et al. ................... 434/21 |
| 2008/0210872 A1 | 9/2008 | Grimberg |
| 2010/0012828 A1* | 1/2010 | Prejean et al. ............. 250/252.1 |

* cited by examiner

CALIBRATION SYSTEMS AND METHODS FOR INFRARED CAMERAS

TECHNICAL FIELD

The present invention relates generally to infrared devices and, more particularly, to systems and methods for calibrating infrared devices.

BACKGROUND

An infrared device (e.g., an infrared sensor or an infrared camera having an infrared sensor, such as a microbolometer array) typically must be calibrated before it can produce an accurate image of the scene being viewed. Without corrections based on calibration data, pixel non-uniformities swamp the image signal and the scene is typically unrecognizable.

A conventional calibration process is generally performed on an infrared camera core that is viewing a uniform-flux scene provided by a high-emissivity uniform blackbody, with the infrared camera core including an infrared detector (within a vacuum package assembly) along with associated electronic components (to operate the infrared detector), a heat sink, and a lens. This conventional calibration process is performed within an environmental chamber over a range of temperatures.

A drawback of this conventional calibration process is that the time necessary to obtain the calibration data over the required temperatures may be excessive, which results in increased manufacturing costs and limits manufacturing capability. Furthermore for this conventional calibration process, it may be difficult to adequately stabilize the temperatures of the infrared camera core and the blackbody, which must be at the same temperature during calibration data acquisition for each desired temperature.

As a result, there is a need, for example, for improved techniques for calibrating infrared devices.

SUMMARY

Systems and methods directed to infrared devices and calibration techniques are disclosed. For example in accordance with one or more embodiments of the present invention, systems and methods for calibrating an infrared sensor are disclosed, which may include generating calibration information (e.g., non-uniformity correction terms) and testing to verify proper calibration. As a specific example in accordance with an embodiment, sensor-level calibration is performed prior to incorporation within a camera core, with a calibration target represented by a high-emissivity and/or a low-emissivity scene. In more general terms in accordance with one or more embodiments, calibration methods and calibration systems are disclosed for infrared devices, which may provide certain advantages as compared to conventional infrared device calibration techniques.

More specifically in accordance with one embodiment of the present invention, a method of obtaining calibration information for an infrared device includes providing a calibration target adapted to provide a low-emissivity scene; performing a calibration operation on the infrared device to obtain the calibration information; and storing the calibration information.

In accordance with another embodiment of the present invention, a calibration target for calibrating an infrared device includes a first surface adapted to provide a low-emissivity scene for the infrared device during calibration of the infrared device.

In accordance with another embodiment of the present invention, a calibration test system includes an environmental chamber; a target array, within the environmental chamber, having a plurality of low-emissivity calibration targets; a production rack, within the environmental chamber, adapted to hold a plurality of infrared devices adjacent to the target array; and a computer system, outside of the environmental chamber, adapted to control the infrared devices and the environmental chamber to generate calibration information for the infrared devices.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

As noted herein, infrared devices (e.g., any type of infrared sensor or infrared camera, including long-wave infrared imaging cameras that use microbolometer arrays) generally are calibrated before they can produce an accurate image of the scene being viewed. Typically as an example, the calibration process may produce per-pixel gain and offset maps (e.g., non-uniformity correction (NUC) data) that are used to correct for pixel non-uniformities associated with the infrared device. The calibration process may also produce terms that are used to compensate for differential changes in pixel behavior over a range of operating temperatures, as would be understood by one skilled in the art. When adequate calibration terms are used by the infrared device, the image output provided more accurately reflects the scene being viewed. The calibration process may also ensure that the infrared device more accurately renders the scene, even if the infrared device is exposed to changing environmental operating temperatures while not stabilizing the temperature of the infrared device (e.g., the temperature of the infrared sensor is not held constant).

The calibration process may involve recording frame data from the infrared device, such as for example an infrared camera, over a range of operating temperatures (e.g., ambient temperatures). As an example, a conventional calibration process may be as described in U.S. Pat. Nos. 5,811,808, 6,028,309, and 6,812,465 or in the 1998 Proceedings of SPIE article entitled "Improvements in Uncooled Systems Using Bias Equalization," which are incorporated herein by reference in their entirety.

The frame data acquired during the calibration process may be used to generate calibration maps, which are used to correct for pixel non-uniformities during camera operation. As an example, the calibration maps may be classified as "on-chip" terms that are applied to the camera's infrared sensor during data acquisition (e.g., during normal camera operation to acquire infrared images), and "off-chip" corrections that are applied to the raw data after being acquired by the infrared sensor.

Figure 1:
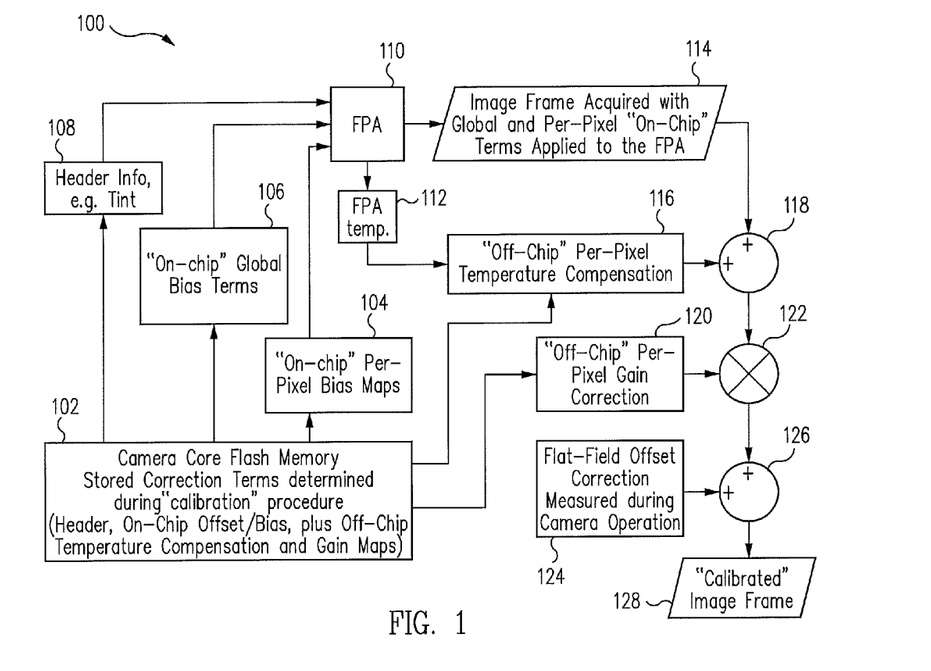
FIG. 1 shows a flowchart illustrating infrared camera operation based on a calibration process in accordance with an embodiment of the present invention.

As a specific example, FIG. 1 shows a flowchart 100 illustrating infrared camera operation and application of calibration information (e.g., calibration data or calibration maps) to an image frame during infrared camera operation in accordance with an embodiment of the present invention. The calibration information (e.g., NUC data) may be determined during a calibration process, as discussed further herein for one or more embodiments, and stored in memory (block 102). This calibration information may then be applied to the image frame data during normal infrared camera operation. Block 102 may represent for some embodiments memory and associated camera electronics (e.g., processor, logic, and/or other types of circuit elements for camera operation).

The memory may represent, for example, one or more types of memory, such as non-volatile memory (e.g., flash memory within the camera core) and/or volatile memory, to store the calibration information (e.g., also referred to as calibration data, calibration terms, NUC data, or calibration maps) determined during a calibration procedure. The memory may also be used to store data generated by infrared device 110. The calibration information may include the on-chip calibration information (e.g., including offset and bias), off-chip calibration information (e.g., including temperature compensation and gain maps), and/or header information (e.g., tint or other various information).

The on-chip calibration information for infrared device 110 (e.g., a focal plane array (FPA) having a microbolometer array and a read-out integrated circuit, such as within a sensor vacuum package assembly (VPA)) is applied to infrared device 110, with the on-chip calibration information including, for example, the on-chip per-pixel bias information (block 104), the on-chip global bias information (block 106), and/or the header information (block 108). The image frame information (block 114) acquired with the on-chip calibration information applied to infrared device 110 may be further compensated with off-chip calibration information, including off-chip per-pixel temperature compensation information (block 116, based on a measured temperature of infrared device 110 (block 112)), an off-chip per-pixel gain correction (block 120), and/or a flat-field offset correction (block 124, measured during camera operation), with these off-chip terms applied as illustrated (e.g., mathematically via blocks 118, 122, and 126). With the calibration information applied, including the on-chip and/or off-chip calibration information, a calibrated image frame (block 128) may be produced.

In general, flowchart 100 depicts an example of an image acquisition approach, such as during normal camera operation, which may be implemented within infrared device 110 (e.g., the camera core or a complete infrared camera system). The on-chip corrections are applied to the infrared sensor (e.g., the FPA) before the image is acquired, while off-chip corrections are applied to the raw frame produced by the infrared sensor. The calibration information (e.g., maps) for both on-chip and off-chip corrections are generated during the calibration process, as explained further herein in accordance with one or more embodiments, and stored (e.g., in camera core flash memory or in other memory for eventual transfer into the camera core memory) for later use during normal camera operation.

Overall, the goal of the calibration process is to produce calibration information (e.g., a complete set of on-chip and off-chip maps), which allow the infrared device to accurately render the scene being viewed while the camera is within a specified range of operating temperatures. The efficacy of calibration terms may be verified during a post-calibration acceptance test procedure (ATP), which typically may be performed within the same environmental chamber used for calibration, as would be understood by one skilled in the art.

As an example in accordance with one or more embodiments of the present invention, the calibration process may be performed on an infrared device, such as a sensor vacuum package assembly (sensor VPA), either before or after the sensor VPA has been built into a camera core on the camera manufacturing line. As an example for the camera core, the camera core may include the sensor VPA and all associated electronic components necessary to operate the sensor VPA. As a specific example, electronic components may be arranged on a power distribution board and/or on a video processing board within the camera core. The camera core may also include an integral heat-sink, for passive thermal management of the sensor VPA, and a lens. However in accordance with an embodiment of the present invention, a partial camera core-level calibration process may also be performed without the lens (referred to herein as lens-less-core calibration), such as with a low-emissivity calibration target as explained further herein. The gain map (e.g., off-chip per-pixel gain correction noted in reference to FIG. 1) may not be generated during lens-less-core calibration, but all other calibration terms may be generated. The gain map may be created after the lens has been mounted on the camera core by an additional calibration process (referred to herein as an alternate lens calibration process).

During a camera core-level (also referred to herein as core-level) calibration process, as noted herein as an example, frame data are acquired by the camera core electronics. The frame data may then be used to produce a set of calibration maps, which may be stored within the camera core memory for use during camera operation (e.g., as discussed in reference to FIG. 1). Calibration frame data may be acquired while viewing a uniform-flux scene, which may be provided by a conventional high-emissivity uniform blackbody. Alternatively as discussed further herein and in accordance with one or more embodiments of the present invention, calibration frame data may be acquired while viewing a uniform-flux scene, which may be provided by a low-emissivity target (e.g., a reflective calibration target, such as an infrared mirror as with a gold-coated scene). For example for an embodiment, a camera core-level (but without the lens or other optical element included) calibration process may be performed with a low-emissivity target using the techniques disclosed herein. The frame data may be acquired at several discrete operating temperatures (e.g., ambient temperatures) to provide temperature compensation terms, with the calibration process performed, for example, inside an environmental chamber.

Figure 2:
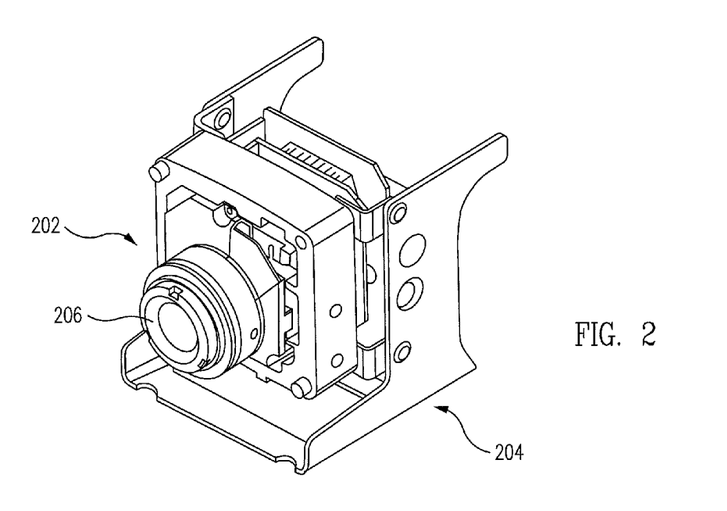
FIG. 2 illustrates a perspective view of an infrared camera core and associated hardware for securing within an environmental chamber in accordance with an embodiment of the present invention.
Figure 3:
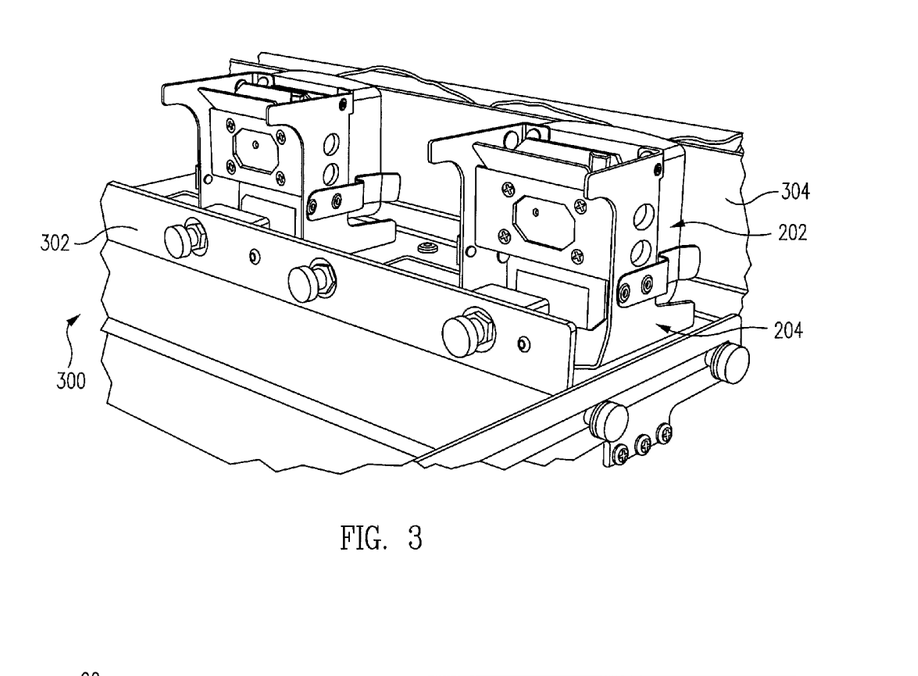
FIG. 3 illustrates a perspective view of a portion of an environmental chamber housing the infrared camera core of FIG. 2 facing a blackbody.

As an example, FIG. 2 illustrates a perspective view of an infrared camera core 202 and associated hardware 204 for securing within an environmental chamber 300 (a portion of which is illustrated in FIG. 3). As an example, the camera core-level calibration process may be performed after the sensor VPA is built into camera core 202, with hardware 204 used to mount camera core 202 onto a rack 302 facing a blackbody scene 304 (or alternatively a low-emissivity scene in accordance with an embodiment, with a lens 206 removed). A number of camera cores 202 and blackbody scenes 304 may be mounted inside environmental chamber 300, with calibration data acquired at discrete temperatures within the specified operating temperature range (e.g., based on infrared camera design specifications or other desired temperature requirements). In general, camera core 202 and blackbody scene 304 must both be at a constant temperature (e.g., constant at the same temperature) during the acquisition of the calibration data.

Figure 4:
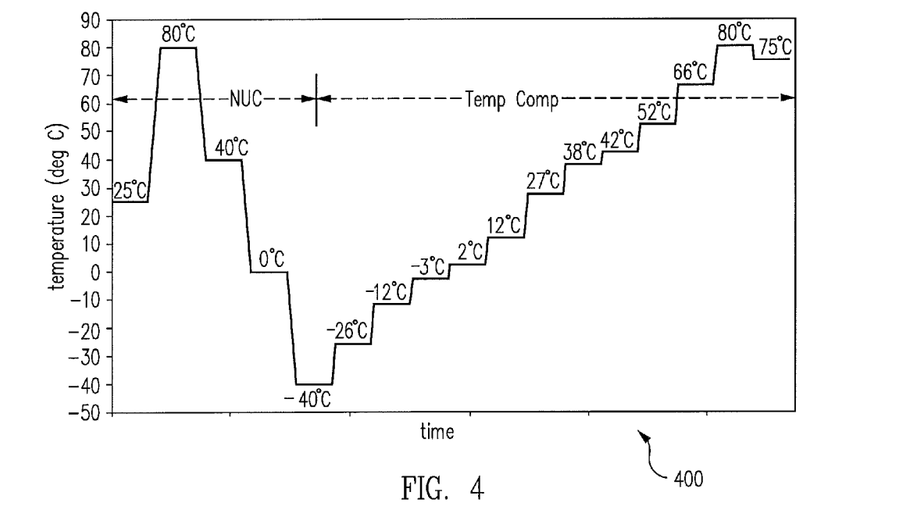
FIG. 4 illustrates a graph showing an example of a calibration temperature profile for obtaining calibration data from the infrared camera core in accordance with an embodiment of the present invention.

The discrete temperatures for acquiring calibration data may represent a calibration temperature profile, which may span a range of operating temperatures. As an example, FIG. 4 illustrates a graph 400 showing an example of a calibration temperature profile (e.g., based on specifications or specific application requirements) for obtaining calibration data from an infrared device (e.g., infrared camera core) in accordance with an embodiment of the present invention. Graph 400 shows for a specific example a typical calibration profile, which depicts desired ambient temperature values at each data acquisition point for all of the individual discrete temperatures where calibration data are acquired. As noted for the above example, the camera core and the blackbody scene must be at the same, constant temperature at each of the data acquisition points. The calibration data acquired at each point in the profile may be stored in the camera core's memory (e.g., flash memory) for use during normal infrared image acquisition to produce an accurate image of the scene (e.g., as discussed in reference to FIG. 1).

During data acquisition for a conventional calibration process using a blackbody scene, it may be difficult and time consuming to maintain the camera core and the blackbody scene at a constant temperature, because no active temperature control resides within the camera core. Thus, the calibration process must wait for camera core temperature stabilization at each intermediate data acquisition point, which may be accomplished by setting the environmental chamber set-point to the desired temperature value and then waiting for the camera core and the blackbody scene to stabilize at the desired temperature.

Figure 5:
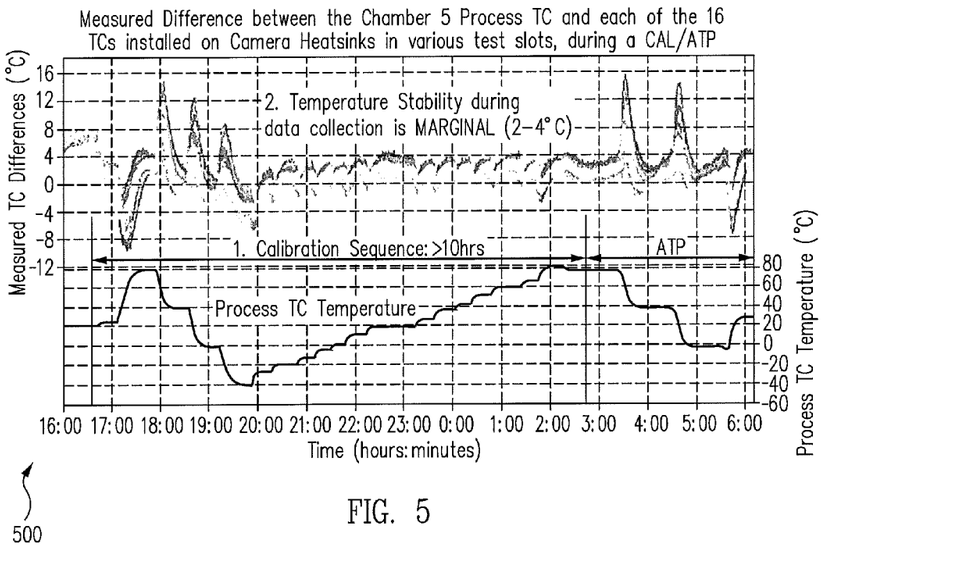
FIG. 5 illustrates a graph showing an example of temperature measurements made during conventional calibration testing.

FIG. 5 illustrates a graph 500 showing an example of temperature measurements made during calibration testing. Specifically, graph 500 depicts temperature measurements made during a typical core-level calibration run, such as for example per the calibration profile illustrated in graph 400 (FIG. 4). The environmental chamber process temperature during the calibration run is shown in the lower portion of graph 500. As illustrated, the calibration run lasts from a time of approximately 16:40 through 02:45, with subsequent post-calibration ATP from a time of approximately 02:45 through 06:15 the following day. Thus, the calibration run sequence for this example requires greater than ten hours for completion.

The data shown in the upper portion of graph 500 were recorded with thermocouples (TC) mounted on several camera core heat-sinks and illustrate the differences between heat-sink thermocouple temperatures and the environmental chamber process temperature. As noted, camera core-level calibration requires the camera core and the blackbody scene to be at a constant and approximately equal temperature during the acquisition of calibration data. However, the measured temperature data from the camera cores shown in graph 500 indicate marginal temperature stability (e.g., in the range of 2-4 □C) during data acquisition.

More specifically, because there is no active temperature control of the heat-sink or sensor VPA, temperature stabilization at each data acquisition point is typically accomplished with convection from environmental chamber airflow, coupled with conduction through the environmental chamber infrastructure and camera core components. This conventional method has certain drawbacks. For example, thermal stabilization of the sensor VPA is uncontrolled, so adequate stabilization during data acquisition is difficult to achieve. As another example, the cycle time of the core-level calibration is quite long, making the process expensive from a manufacturing point of view (e.g., the calibration profile shown in FIG. 5 extends from 4:35 PM through 2:45 AM the following day, a total of more than 10 hours for this example). Furthermore, the data of graph 500 illustrates that temperature stabilization of the Sensor VPAs of the camera cores at each data acquisition point may be marginal.

For camera core-level calibration using the blackbody scene, the requirement for temperature stabilization at each data acquisition point is in direct conflict with the desire to reduce overall calibration cycle time and increase manufacturing production volume. For example, improved temperature stability may require longer soak times at each intermediate temperature, but this leads to inordinately long calibration runs, while reducing the cycle time by limiting soak times at each stabilization point may produce inferior calibration data.

In contrast to conventional approaches using a camera core and a blackbody scene, sensor-level calibration techniques are disclosed in accordance with one or more embodiments of the present invention. The sensor-level calibration process may improve calibration data quality (e.g., improved temperature stabilization) and/or improve manufacturing efficiency (e.g., reduced cycle time) relative to some conventional approaches.

Figure 6:
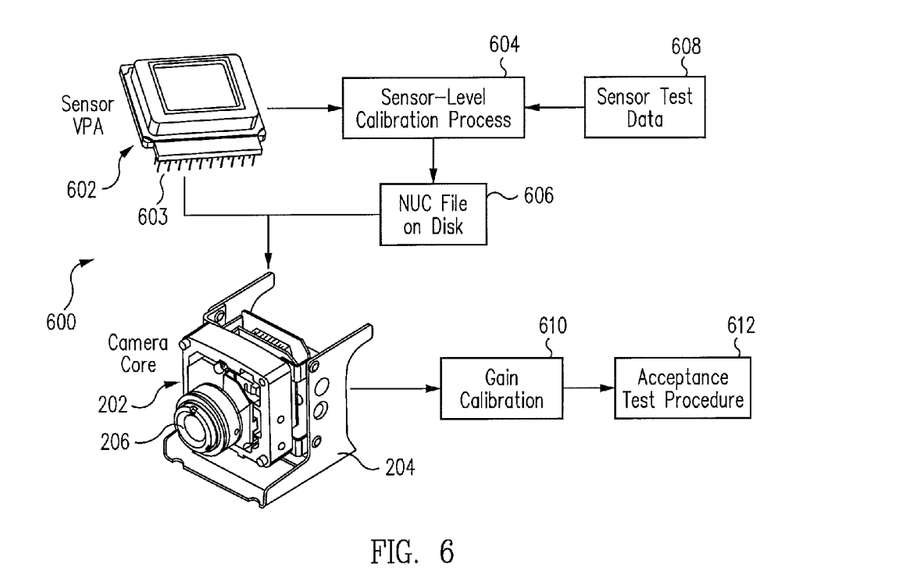
FIG. 6 illustrates a flowchart of a sensor-level calibration process in accordance with an embodiment of the present invention.

As a specific example, the sensor-level calibration process may produce calibration maps before the infrared sensor is built into a camera core and may provide certain advantages over conventional camera core-level calibration approaches. As an example, FIG. 6 illustrates a flowchart 600 of a sensor-level calibration process 604 in accordance with an embodiment of the present invention.

In general, flowchart 600 may be viewed as a generic process flow for infrared sensor calibration, with for example, a sensor VPA 602 being the only camera core component that is subjected to the generic calibration process. Additionally, the generic process flow of flowchart 600 may utilize data from prior infrared sensor test results (e.g., sensor test data 608), such as gain map data and bad-pixel map data, as would be understood by one skilled in the art. The output of sensor-level calibration process 604 is a data file 606 (i.e., file), which may be stored in electronic format until sensor VPA 602 is built into camera core 202. When camera core 202 is built, for example, data file 606 corresponding to sensor VPA 602 may be uploaded into memory of camera core 202. Furthermore for example, once a lens 206 is in place, a gain map may be produced in a separate gain calibration 610 process. Camera core 202 may then be subjected to ATP 612.

In accordance with an embodiment of the present invention, sensor-level calibration process 604 may be performed, as discussed further herein, using the same set of electronics that are to be shipped with camera core 202. Furthermore, the same electronics used to calibrate sensor VPA 602 may also be used during ATP 612. Alternatively in accordance with an embodiment of the present invention, test results indicate that sensor VPA 602 may be calibrated with one set of test electronics, while sensor VPA 602 may be incorporated into camera core 202 with a different set of electronics, and camera core 202 performance may be comparable to conventional camera core-level calibration. Thus, performing sensor-level calibration process 604 with one set of test electronics and imaging with sensor VPA 602 within camera core 202 having camera electronics different than the test electronics may not significantly degrade camera performance (e.g., depending upon the desired application and camera requirements).

Specifically in accordance with one or more embodiments, sensor-level calibration process 604 (also referred to herein as the "sensor Calibration" Process) may produce a set of calibration maps (e.g., calibration information represented by data file 606, but without gain maps) before sensor VPA 602 is built into camera core 202. As an example, data file 606 (sensor calibration maps) may be stored in a NUC file in electronic format (e.g., an electronic file written to a hard disk of a computer). After sensor-level calibration process 604, when sensor VPA 602 is built into camera core 202, data file 606 corresponding to the particular sensor VPA 602 is loaded into memory of camera core 202 (e.g., the camera's flash memory at the location designated for calibration maps). For example, data file 606 may be loaded into the memory of camera core 202 via a serial transfer from the hard disk file of the computer. Once lens 206 is attached to camera core 202 (e.g., as camera core 202 is being built), gain calibration 610 may be performed, with the resulting gain map added to the memory of camera core 202 (e.g., the camera's flash memory to complete the required complement of calibration maps for the particular camera core 202 with sensor VPA 602 and lens 206).

Gain calibration 610 may be accomplished, in accordance with an embodiment of the present invention, via an alternate-lens calibration process, which may also be used generically for various lens-less camera core products. For example in accordance with an embodiment, gain calibration 610 may measure gain at only a single temperature, which may be sufficient over the entire operating temperature range of the camera (e.g., camera core 202). Thus, for example, gain calibration 610 may be performed at room temperature, and the resulting gain map added to the memory of camera core 202 to complete the required complement of calibration maps. Alternatively in accordance with an embodiment, gain calibration 610 may be performed at a number of discrete operating temperatures in an environmental chamber (e.g., using camera core 202 and hardware 204), as in a "gain-only" calibration process.

Flowchart 600 and generally sensor-level calibration process 604 may provide certain advantages over conventional manufacturing processes. For example, a production-level sensor calibration system may minimize the batch-process calibration cycle time for the specified operating temperature range (e.g., −40° C. to +80° C.) and/or may improve the temperature stability of the sensor VPA and calibration target during data acquisition at each discrete temperature designated in the calibration profile.

For example in accordance with an embodiment, sensor-level calibration process 604 may include actively controlling the temperature of each sensor VPA 602 within the ambient conditions provided by the environmental chamber. Because active temperature control may be used, there is no need to soak the sensor VPA 602 at each data acquisition point, and the resulting calibration cycle time may be significantly shortened. Furthermore, active temperature control may limit the temperature drift of the sensor VPA 602, resulting in improved temperature stability of sensor VPA 602 during data acquisition. Thus, sensor-level calibration process 604 using active temperature control may overcome certain issues with conventional camera core-level calibration by providing reduced cycle time while at the same time improving temperature stability.

In general, faster slewing rates and stabilization times may significantly reduce the overall calibration cycle time, saving time and reducing manufacturing costs. Active temperature control is possible with sensor-level calibration, because sensor VPA 602 is not surrounded by other camera core components, allowing a temperature control mechanism (e.g., a thermo-electric cooler (TEC)) to be placed in close physical contact with sensor VPA 602. For conventional approaches, active temperature control during camera core-level calibration would be much more difficult, because the camera core prevents placement of a temperature control device in close contact with the sensor VPA.

The calibration target for sensor-level calibration process 604 may be the conventional blackbody (i.e., blackbody scene, representing a high-emissivity uniform blackbody calibration target). Alternatively in accordance with one or more embodiments, the calibration target for sensor-level calibration process 604 may be made of a low-emissivity (i.e., reflective) material, so that its temperature does not need to be controlled. Thus, the low-emissivity calibration target may simply reflect the temperature of sensor VPA 602 (e.g., the focal plane array temperature) back onto itself, the technique of which may be referred to or viewed as a "narcissus calibration" in reference to the generally undesirable effect of reflective materials lining the optical path of an infrared camera.

This "narcissus" approach generally satisfies calibration theory that requires the calibration scene (the calibration target) and the sensor VPA (e.g., the focal plane array) to be at a constant temperature during data acquisition. For example for an embodiment, the sensor VPA (e.g., the focal plane array (FPA)) is at a constant temperature because the sensor VPA is temperature controlled; and so, the reflection of the sensor VPA (e.g., the FPA) is also at a constant temperature. Thus for example for one or more embodiments, the use of the low-emissivity calibration target may allow a less-complex and lower-cost calibration system design (i.e., low-emissivity calibration targets do not require temperature control), while the use of the conventional high-emissivity scene (e.g., blackbody) would require additional temperature control apparatus to keep the high-emissivity calibration target at a constant temperature (the same temperature as the sensor VPA) during data acquisition at one or more discrete temperatures according to the calibration profile.

Sensor-level calibration process 604, in addition to possibly a reduced calibration time coupled with better temperature stability, may also transfer the production yield determination due to calibration errors to an earlier point along the manufacturing production line, relative to some conventional approaches. For example in accordance with one or more embodiments, sensor-level calibration process 604 may include standard tests that measure the effectiveness of the calibration maps (e.g., stored as data file 606). Thus, if sensor VPA 602 does not meet the performance criteria for these standard tests, then sensor VPA 602 would not be built into camera core 202. In contrast for a conventional camera core-level approach, sensor calibration effectiveness is not measured until after the sensor VPA has been built into a camera core. If the sensor VPA fails certain tests, then camera core may be re-calibrated, and under certain circumstances, camera core may need to be disassembled and the sensor VPA replaced, which is costly and time consuming. Thus, sensor-level calibration process 604 may reduce the proportion of camera cores 202 requiring re-calibration or sensor VPA 602 replacement by identifying some portion of calibration errors or defects prior to building sensor VPA 602 into camera core 202.

Sensor-level calibration process 604 may provide additional advantages. For example, sensor-level calibration process 604, because the calibration is performed at the sensor VPA level, may allow sensor VPA 602 to be built into any camera core model. The only camera core model-specific calibration information is gain calibration 610 (e.g., gain map), which may be performed in a separate step once sensor VPA 602 is incorporated into the desired camera core. Thus for sensor-level calibration process 604, creating calibration maps, other than gain, may be viewed as a generic process, which may allow additional sales possibilities (e.g., infrared sensor-only sales, with the customer receiving the sensor VPA and an associated calibration file (e.g., data file 606)). Although it may be possible to sell a sensor VPA without a calibration file, sensor-level calibration process 604 allows sensor-only sales, without requiring the customers to understand sensitive or complex details with respect to the calibration process.

Figure 7:
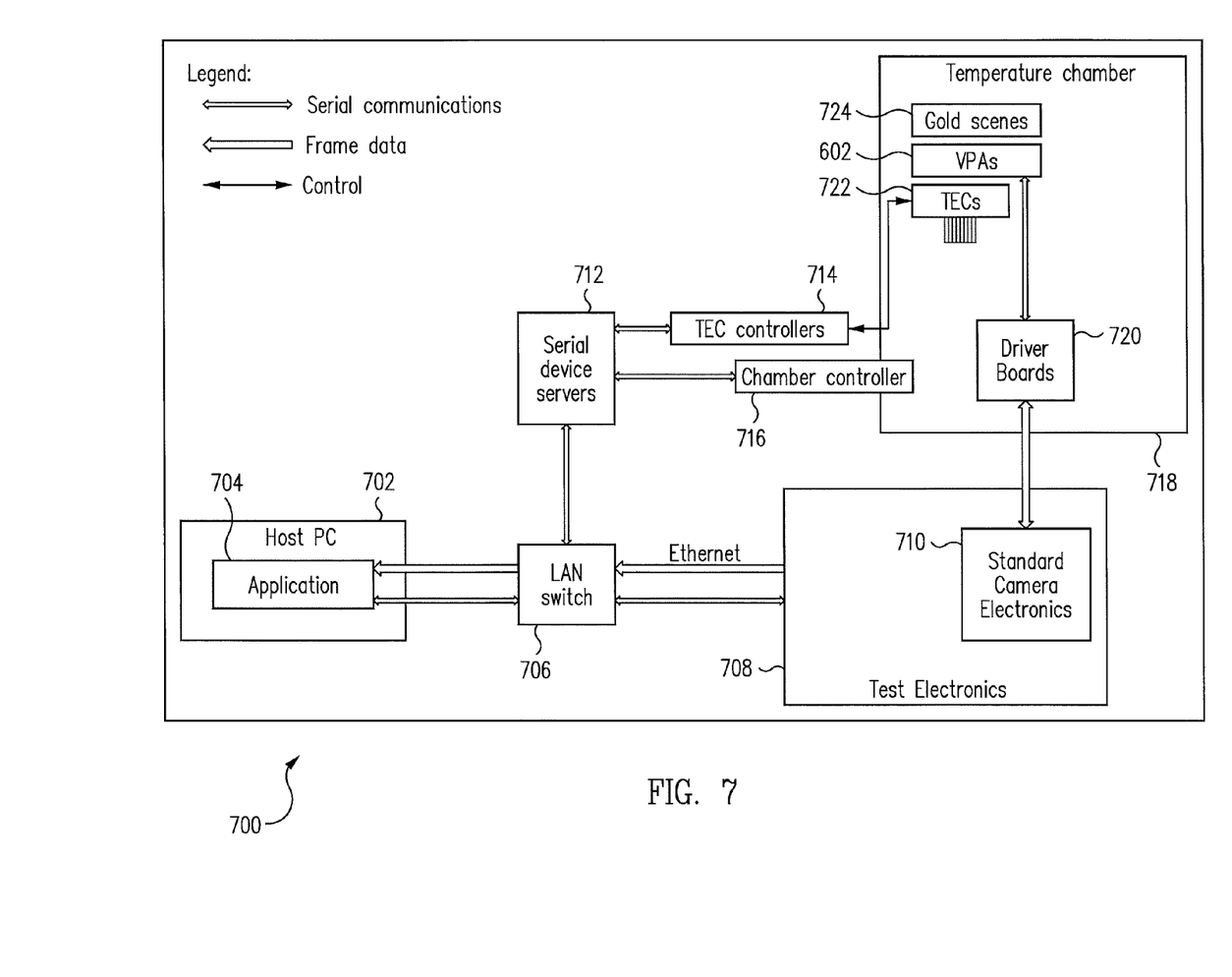
FIG. 7 illustrates a block diagram of a sensor-level calibration system in accordance with an embodiment of the present invention.

FIG. 7 illustrates a block diagram of a sensor-level calibration system 700 in accordance with an embodiment of the present invention. In general, sensor-level calibration system 700 depicts an example of a sensor calibration system data connectivity architecture. An environmental chamber 718 (e.g., similar to environmental chamber 300 or an environmental chamber as discussed further herein) may provide a gross environmental temperature control, as well as isolation from humidity, while fine temperature stabilization for each sensor VPA 602 at data acquisition points may be provided by a corresponding TEC (thermo-electric cooler) 722. Environmental chamber 718 and TECs 722 may be controlled by a computer 702 (e.g., a host personal computer (PC)) running one or more desired calibration test applications 704, as would be understood by one skilled in the art. Calibration data are acquired by computer 702 through a standard set of camera electronics 710, which are mounted on a test board 708 that provides data connectivity to computer 702 (e.g., via Ethernet). A calibration target 724 may be provided by a low-emissivity scene (e.g., a gold scene such as a surface plated with gold) mounted near and associated with each sensor VPA 602. For example, calibration target 724 may represent a low-emissivity target (e.g., having a flat or rounded surface) and made of a suitable reflective material or coated with a suitable reflective material (e.g., gold).

Specifically, sensor-level calibration system 700 provides an example of a production system to support sensor-level calibration process 604 in accordance with an embodiment of the present invention. A temperature of sensor VPA 602 being calibrated may be controlled by TEC 724, while a high-emissivity or low-emissivity scene may be located appropriately and associated with sensor VPA 602 to provide a uniform flux field during data acquisition. Sensor VPA 602 may be connected to a standard set of camera electronics 710 via a driver board 720, which drives the signals between sensor VPA 602 and the remote set of camera electronics 710 (e.g., outside of environmental chamber 718).

For example, camera electronics 710 may provide bias voltages to sensor VPA 602, as well as all serial commands required for sensor VPA 602 operation. Camera electronics 710 may also receive serial and frame data from sensor VPA 602. As a specific example, camera electronics 710 may be mounted on test board 708 that provides an Ethernet interface to computer 702 (e.g., via local area network (LAN) switch 706). This architecture may allow computer 702 using calibration test applications 704 to control sensor VPA 602 and receive frame data that may be required for calibration (e.g., generate data file 606). Computer 702 using calibration test applications 704 may also control environmental chamber 718 (e.g., via LAN switch 706, serial device servers 712, and a chamber controller 716) and control temperatures of TECs 722 (e.g., via LAN switch 706, serial device servers 712, and TEC controllers 714) to implement desired calibration temperature profiles.

Figure 8:
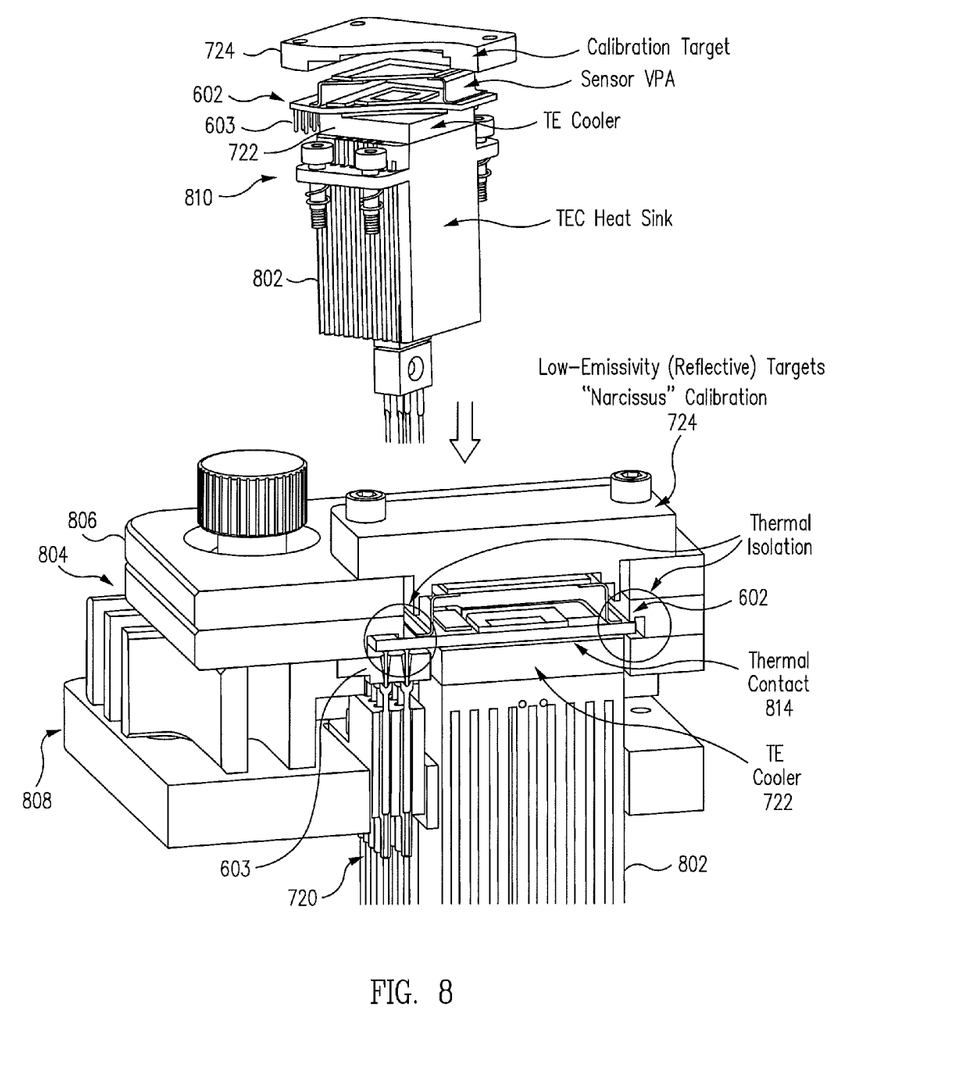
FIG. 8 illustrates a diagram of an exemplary implementation of a portion of the sensor-level calibration system of FIG. 7 in accordance with an embodiment of the present invention.
Figure 9A:
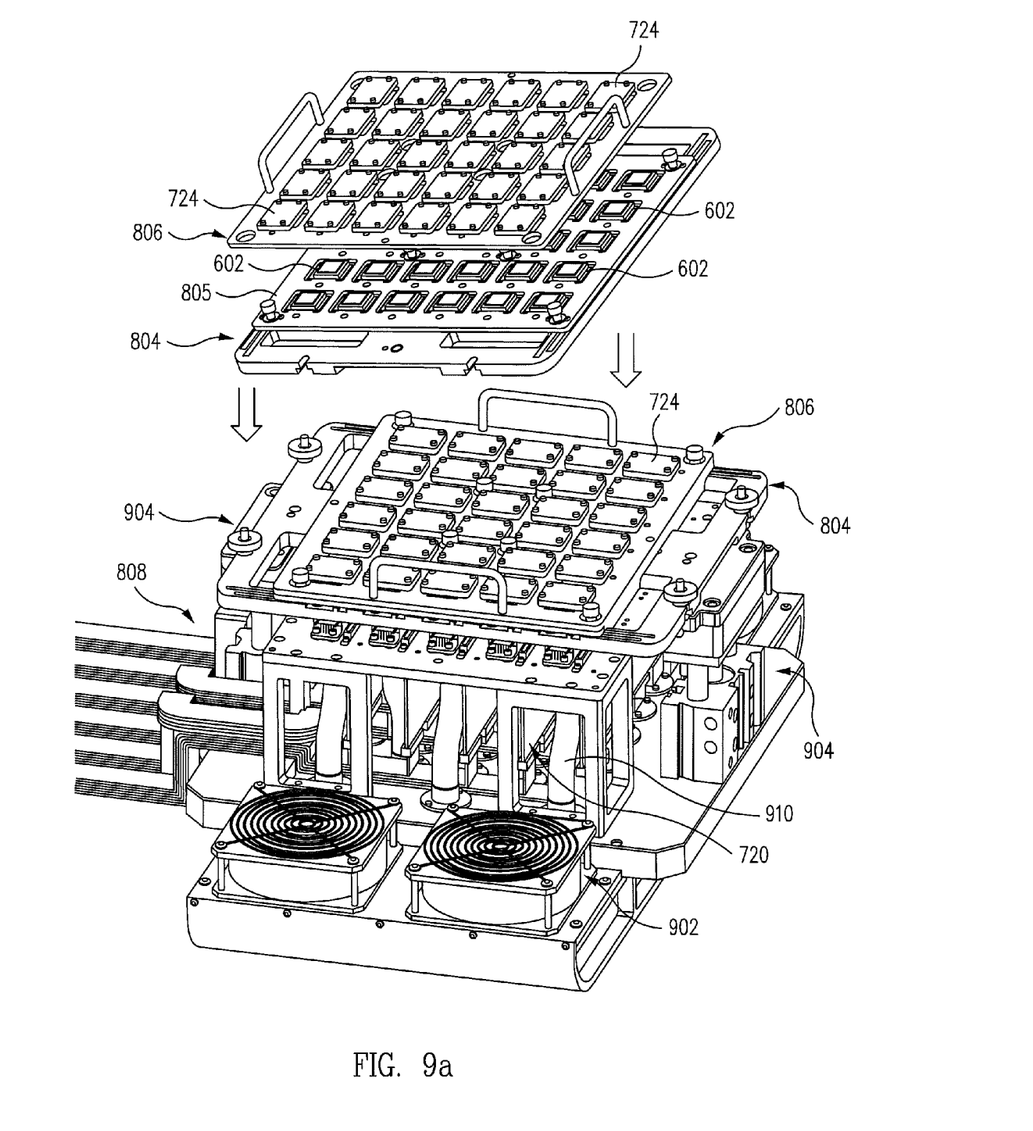
FIG. 9a illustrates a diagram of an exemplary implementation of production pallet hardware for application with the sensor-level calibration system of FIG. 7 in accordance with an embodiment of the present invention.
Figure 9B:
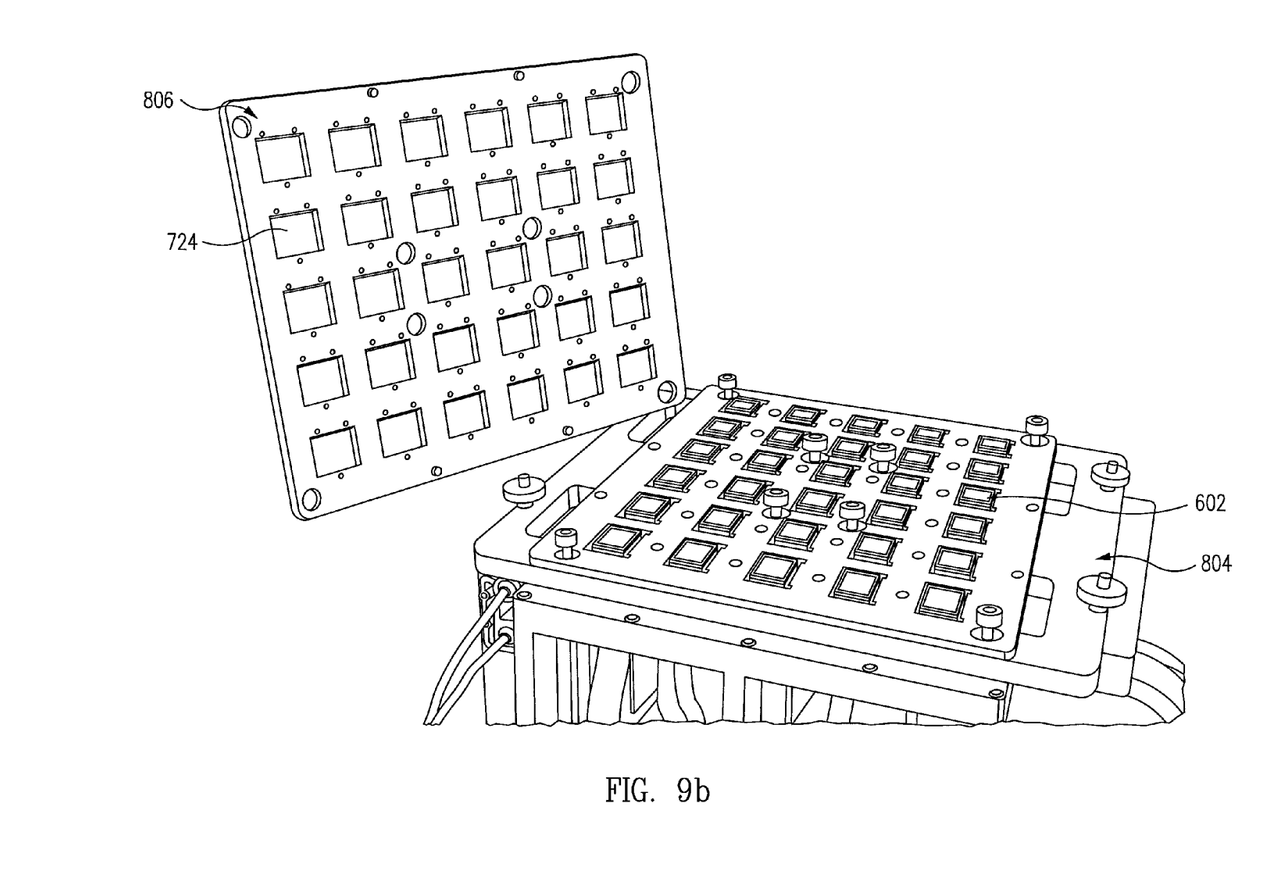
FIG. 9b illustrates a diagram of an exemplary implementation of a portion of the production pallet hardware of FIG. 9a for application with the sensor-level calibration system of FIG. 7 in accordance with an embodiment of the present invention.
Figure 9C:
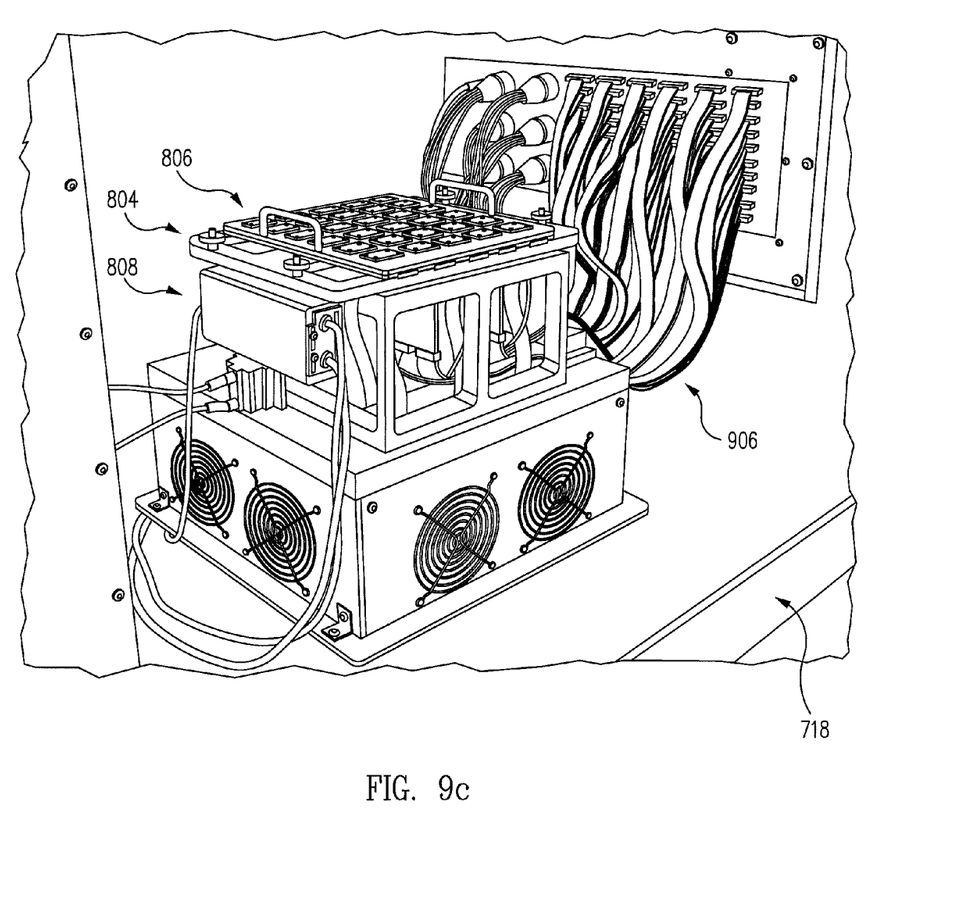
FIG. 9c illustrates a diagram of an exemplary implementation of a portion of the sensor-level calibration system of FIG. 7 in accordance with an embodiment of the present invention.
Figure 10:
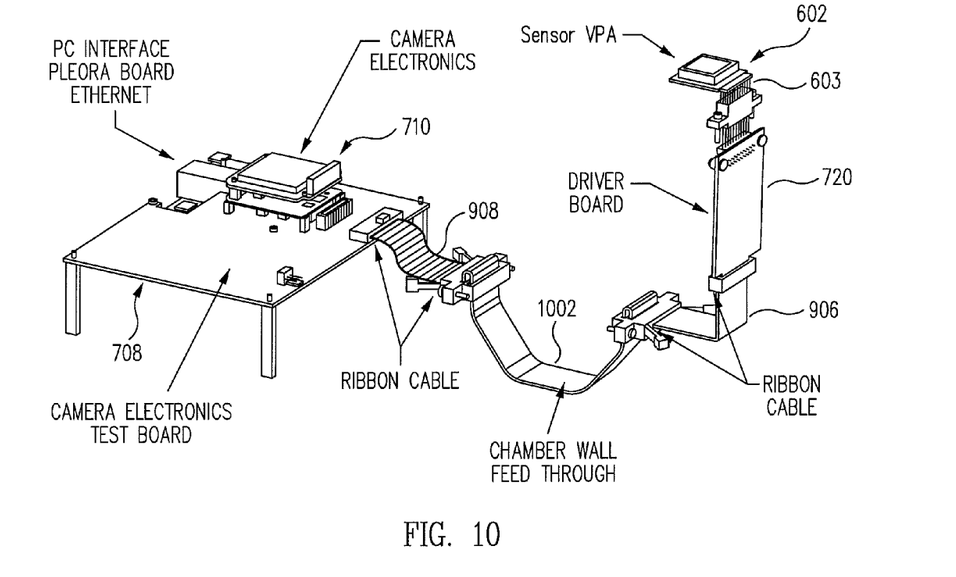
FIG. 10 illustrates a diagram of an exemplary implementation of a portion of the sensor-level calibration system of FIG. 7 in accordance with an embodiment of the present invention.
Figure 11:
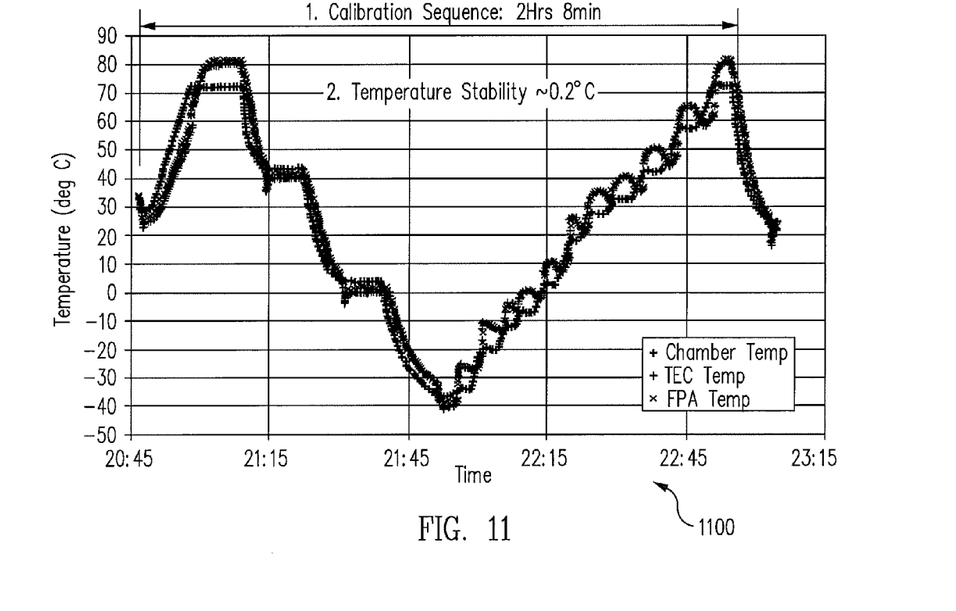
FIG. 11 illustrates a graph showing an example of temperature measurements made during sensor-level calibration testing in accordance with an embodiment of the present invention.

FIGS. 8 through 10 illustrate specific implementation examples for various portions of sensor-level calibration system 700, while FIG. 11 illustrates an example of a sensor-level calibration temperature profile performance using sensor-level calibration system 700. Specifically, FIG. 8 illustrates a diagram of an exemplary implementation of a cross-section with expanded view of sensor VPA 602 with associated calibration target 724 (e.g., low-emissivity scene for this example) and TEC 722 for sensor-level calibration system 700 in accordance with an embodiment of the present invention. Calibration target 724 provides a low-emissivity scene and may be positioned above sensor VPA 602 to provide a uniform flux field (e.g., to the detector array of sensor VPA 602). TEC 722 may be positioned below sensor VPA 602 to stabilize sensor VPA 602 temperature (e.g., fine temperature stabilization and active temperature control) during data acquisition. TEC 722 may be mounted on a heat sink 802 to provide sufficient heat transfer, while environmental chamber 718 may further provide heat transfer through convection (e.g., via fans 902 as shown in FIGS. 9a and 9c) using air in environmental chamber 718, which may allow continuous TEC 722 operation and may further provide optimal temperature control conditions.

As further illustrated in FIG. 8, various thermal contacts and thermal isolation may be provided to further aid in providing temperature control, as would be understood by one skilled in the art. For example, a thermal pad (e.g., a thermal contact 814) between TEC 722 and sensor VPA 602 may provide enhanced thermal conductivity between TEC 722 and sensor VPA 602.

As shown in FIG. 8 and further illustrated in FIGS. 9a-9c, sensor VPAs 602 may be positioned with TECs 722 using a production pallet 804 (e.g., a 30-up sensor VPA production pallet). Production pallet 804 may ensure that pins 603 of sensor VPA 602 contact various mounting pins on sensor calibration tooling 808 to make a good electrical contact with driver boards 720 (e.g., via various connectors as further illustrated in FIG. 10) that connect sensor VPAs 602 to camera electronics 710 and test board 708. Production pallet 804 may be designed to thermally isolate sensor VPAs 602 from the pallet structure and sensor calibration tooling 808, minimize sensor VPA 602 heat-load, and make it easier for TECs 722 to control the temperature of sensor VPA 602. Furthermore, connectors 810 (e.g., shoulder screws with optional springs) may be used to couple (or float) heat sink 802 relative to sensor calibration tooling 808 to provide additional thermal isolation. As another example, forced air may be routed via channels 910 to blow on heat sink 802 (e.g., the fins of heat sink 802) to provide a baseline temperature for TEC 722 to control against and assist in providing temperature control.

Production pallet 804 may include a keeper plate 805, which may help to secure and align sensor VPAs 602 onto the pallet structure and sensor calibration tooling 808 during the calibration process. Sensor calibration tooling 808, which may include associated hardware for supporting production pallet 804 within environmental chamber 718, may further include lifts 904 (e.g., pneumatic lifts/actuators) to move production pallet 804 down to properly mate sensor VPAs 602 (including pins 603) with various associated sensor calibration system elements (e.g., TECs 722 and driver boards 720).

In addition to production pallet 804 being mounted onto sensor calibration tooling 808 (e.g., generally the tooling and support structure within environmental chamber 718), a target pallet 806 providing an array of calibration targets 724 (e.g., low-emissivity scenes, such as gold scenes as illustrated in FIG. 9b) may be positioned relative to (e.g., mounted upon) production pallet 804. Production pallet 804, target pallet 806, and sensor calibration tooling 808 along with associated hardware may be positioned within environmental chamber 718 (e.g., as illustrated in FIG. 9c) to perform calibration testing for sensor VPAs 602.

Figure 9D:
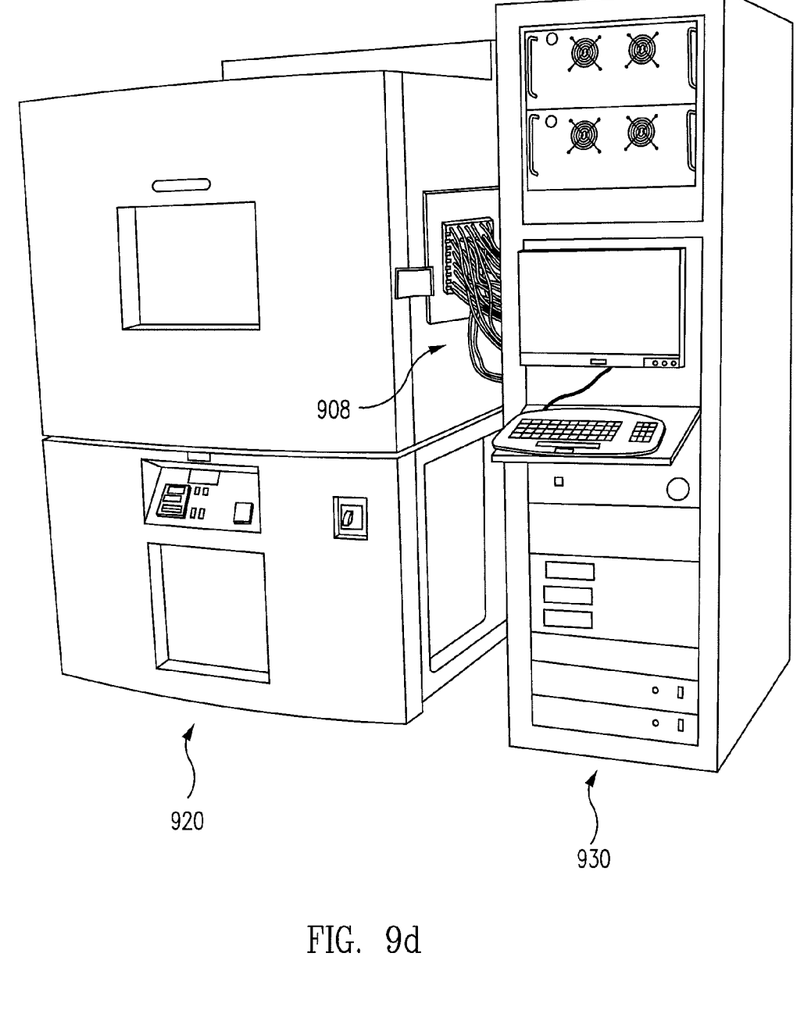
FIG. 9d illustrates a diagram of an exemplary implementation of the sensor-level calibration system of FIG. 7 in accordance with an embodiment of the present invention.

Various cabling may be provided to couple sensor VPAs 602 to computer 702. For example, ribbon cables 906 may be provided within environmental chamber 718 to couple with ribbon cables 908 outside of environmental chamber 718 (e.g., via a feed through cable 1002) as illustrated in FIGS. 9c, 9d, and 10. Furthermore, FIG. 9d illustrates an external view of a complete test system, such as for example sensor-level calibration system 700, with a system 920 representing for example environmental chamber 718 (e.g., to contain sensor VPAs 602 and various components discussed in reference to FIGS. 7-9c and 10) and with a system 930 representing for example computer 702 and associated support hardware (e.g., LAN switch 706, serial device servers 712, TEC controllers 714, chamber controller 716, and/or test electronics 708 with camera electronics 710).

FIG. 11 illustrates a graph 1100 showing an example of a calibration temperature profile and temperature measurements made during sensor-level calibration testing (e.g., with sensor-level calibration system 700) in accordance with an embodiment of the present invention. Specifically, graph 1100 depicts temperature measurements made during a typical calibration run, such as for example per the calibration profile illustrated in graph 400 (FIG. 4). As shown in graph 1100, the production system cycle time (calibration run) may be performed in approximately two hours, which represents a significant improvement over conventional camera core-level convection calibration techniques (e.g., calibration run requiring more than ten hours). Furthermore, in addition to significantly reducing the calibration run time required (e.g., approximately two hours), temperature stabilization at each data acquisition point has also been improved (e.g., to approximately 0.2° C. as compared to a range of 2-4 □C for a conventional camera core-level convection calibration technique).

As discussed herein, conventional infrared camera calibration systems use high emissivity "blackbody" targets that provide a spatially uniform temperature scene during data acquisition and provide a constant radiant flux over the sensor array for the calibration process. If the scene is uniform, then the photon flux at each infrared sensor (e.g., each microbolometer element in the array) is approximately equivalent (e.g., within noise margins). Under these conditions, the camera (e.g., infrared device) would be expected to produce a spatially uniform image, with a goal of the calibration process being to force the camera to produce a uniform image when viewing a uniform "blackbody" scene. A requirement for this calibration approach is that the target scene (blackbody), the infrared sensor (e.g., focal plane array), and the optical elements must all be at approximately the same temperature during data acquisition, with the temperature of all components remaining constant. For example, if one or more elements of the optical system were at a different temperature, then stray energy would skew the flux across the infrared sensor (e.g., microbolometer array) and negatively impact calibration quality.

In contrast in accordance with one or more embodiments for the sensor-level calibration process, there are no optical elements, so only the target scene and the infrared device (e.g., focal plane array) must be held at a constant temperature. Consequently, a low-emissivity target scene may replace the uniform blackbody scene, with the reflective target (low emissivity) generally serving the same purpose as a blackbody (high emissivity) in that it provides a uniform flux scene in front of the infrared sensor (e.g., infrared sensor array).

A conventional infrared camera calibration system may perform responsivity measurements at several steps during the calibration sequence, such as for gain calibration. For example, gain calibration may be performed at the temperature midpoint of each NUC table, with the camera electronics calculating a gain for each pixel after viewing the ambient and hot blackbodies (e.g., two blackbodies at different temperatures, such as with one heated to an elevated temperature). This gain map may then be stored in the NUC table during the calibration process.

For sensor-level calibrated cameras in accordance with one or more embodiments, generation of the gain map may occur as a separate step after calibration. For example, the gain maps may be created during ATP. Specifically as an example, a sensor-level calibrated vacuum package (e.g., sensor VPA 602) may be built into a camera, with the camera then subjected to ATP to determine conformance to camera specifications and with gain maps generated in the environmental chamber prior to ATP (e.g., as discussed in reference to flowchart 600). This approach may necessitate a modified temperature cycle during ATP, depending upon the temperature profiles (e.g., the gain maps may be generated at the midpoint of each temperature table, while ATP data is acquired at 3 degrees below the high-temperature point of each temperature table).

In accordance with one or more embodiments of the present invention, an alternative lens calibration process may be performed prior to ATP. For example, a synthetic gain map may be created during the sensor-level calibration process and then loaded into the camera when the camera is built. The alternative lens calibration process may then be used to generate the final gain maps prior to ATP. For this example, no additional temperature cycle may be required prior to ATP (e.g., a synthetic gain map along with the alternative lens calibration process may create valid gain maps in sensor-level calibrated cameras).

Systems and methods are disclosed herein to provide calibration techniques and manufacturing techniques for infrared cameras. In general, infrared devices (e.g., infrared cameras, such as long-wave infrared cameras) may require calibration to produce an accurate image of the scene. The calibration process creates maps that may be used to correct pixel non-uniformities and to compensate for differential changes in pixel behavior over a range of operating temperatures for the infrared sensor. For a conventional calibration process, calibration maps are generated while the camera core views a uniform blackbody scene.

In contrast in accordance with one or more embodiments of the present invention, a calibration process is disclosed that allows the infrared sensor (e.g., sensor array or sensor package) to be calibrated before the infrared sensor is built into a camera core. For example for some embodiments, the sensor packages (e.g., sensor VPAs) may be exposed to a uniform flux field that may be generated with either a high-emissivity target or a low-emissivity target. The sensor package is run through a calibration temperature profile while viewing the target, with non-uniformity maps recorded at a number of intermediate temperatures. The calibration maps corresponding to each specific sensor package may then be loaded into the camera core when the core is being built.

This sensor-level calibration process may have certain distinct advantages over the current camera core-level process. For example during calibration, the temperature slewing rate over the required range of operating temperatures may be greatly increased, reducing the overall calibration cycle time and lowering production cost. As another example, the sensor calibration approach may allow screening of defective sensor packages before they are built into cores, further reducing production line costs by moving up the sensor yield hit determination. As a further example, another advantage of the sensor-level calibration process is that the sensor may be built into any camera core model and, thus, calibration of the sensor becomes a generic process, which may create a potential new market for sensor package sales without requiring sensor-only customers to understand complex details of the calibration process.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A calibration target for calibrating an infrared device, the calibration target comprising:
   a first surface adapted to provide a low-emissivity scene for the infrared device during calibration of the infrared device; and
   wherein the calibration target is one of a plurality of calibration targets on a target pallet for calibrating a corresponding plurality of the infrared devices.

2. The calibration target of claim 1, wherein the first surface of the calibration target comprises a coating made of gold.

3. The calibration target of claim 1, wherein the calibration target provides a uniform flux scene during calibration of the infrared device.

4. The calibration target of claim 1, wherein the calibration target comprises an infrared mirror.

5. The calibration target of claim 1, wherein the infrared device is an infrared camera core without a lens.

6. The calibration target of claim 1, wherein the infrared device is an infrared detector vacuum package assembly.

7. A method of obtaining calibration information for an infrared device, the method comprising:
   providing a calibration target adapted to provide a low-emissivity scene, wherein the calibration target is one of a number of calibration targets on a target pallet within an environmental chamber;
   performing a calibration operation on the infrared device to obtain the calibration information, wherein the infrared device is one of a number of the infrared devices on a production pallet within the environmental chamber;
   controlling a temperature of the infrared device during the calibration operation; and
   storing the calibration information.

8. The method of claim 7, wherein the infrared device is a vacuum package assembly having an array of microbolometers, and wherein the vacuum package assembly is not within an infrared camera core.

9. The method of claim 7, wherein the calibration target provides a reflective surface made of gold.

10. The method of claim 7, wherein the infrared device is an infrared camera core without a lens.

11. The method of claim 10, further comprising:
    coupling a lens to the infrared camera core;
    performing a gain calibration operation to obtain gain calibration information for the infrared camera core with the lens; and
    storing the gain calibration information with the calibration information.

12. The method of claim 11, further comprising performing an acceptance test procedure on the infrared camera core with the lens.

13. An infrared device system comprising the infrared device, which comprises the infrared camera core with the lens, and a memory within the infrared camera core and containing the associated calibration information, wherein the calibration information is produced according to the method of claim 12.

14. An infrared device system comprising the infrared device, which comprises the infrared camera core without a lens, and a memory within the infrared camera core and containing the associated calibration information, wherein the calibration information is produced according to the method of claim 10.

15. The method of claim 7, wherein the controlling a temperature of the infrared device comprises controlling a temperature of the infrared device over a number of temperature values during the calibration operation with a thermo-electric cooler.

16. The method of claim 15, wherein the infrared device is not within an infrared camera core and is without a lens, and wherein the calibration information comprises offset and bias values.

17. The method of claim 7, wherein the performing of the calibration operation further comprises:
   driving image frame data received from the infrared devices within the environmental chamber to test electronics located outside of the environmental chamber; and
   determining the calibration information based on the image frame data.

18. The method of claim 7, further comprising:
   coupling the target pallet to the production pallet to align the calibration targets to the infrared devices; and
   coupling the infrared devices to a test system located outside of the environmental chamber, wherein the test system determines the calibration information for the corresponding infrared devices based on image frame data received from the infrared devices.

19. An infrared device system comprising the infrared device, which comprises an infrared sensor vacuum package assembly not within an infrared camera core, and a memory containing the calibration information associated with the infrared sensor vacuum package assembly, wherein the calibration information is produced according to the method of claim 7.

20. A calibration test system comprising:
   an environmental chamber;
   a target array, within the environmental chamber, having a plurality of low-emissivity calibration targets;
   a production rack, within the environmental chamber, adapted to hold a plurality of infrared devices adjacent to the target array; and
   a computer system, outside of the environmental chamber, adapted to control the infrared devices and the environmental chamber to generate calibration information for the infrared devices.

21. The calibration test system of claim 20, wherein each of the low-emissivity calibration targets provides a reflective surface made of gold.

22. The calibration test system of claim 20, wherein each of the infrared devices comprises an infrared sensor vacuum package assembly.

23. The calibration test system of claim 20, wherein each of the infrared devices comprises an infrared camera core without a lens.

24. The calibration test system of claim 23, wherein the production rack is configured to couple to the target array, and wherein the computer system is configured to receive information from the infrared devices to generate the calibration information.

25. The calibration test system of claim 24, further comprising:
   test electronics disposed outside of the environmental chamber and adapted to be in communication with the computer system; and
   driver boards, within the environmental chamber, adapted to couple to the infrared devices and transfer the information between the test electronics and the infrared devices.

26. The calibration test system of claim 25, further comprising thermo-electric coolers adapted to couple to the infrared devices to actively control a temperature of the infrared devices, and wherein the computer system is adapted to receive the information from the test electronics to generate the calibration information and is further adapted to control a temperature within the environmental chamber and to control a temperature of the infrared devices via the thermo-electric coolers to perform a calibration temperature profile for the infrared devices.

27. The calibration test system of claim 26, wherein the information comprises infrared image data, and wherein the calibration information comprises offset and bias values.

\* \* \* \* \*